(12) United States Patent
Shin et al.

(10) Patent No.: US 12,361,208 B2
(45) Date of Patent: Jul. 15, 2025

(54) METHOD AND SYSTEM FOR IDENTIFYING AND VISUALIZING DATA DIFFERENCES BETWEEN DATA SETS

(71) Applicant: Fivecast Pty Ltd, Kent Town (AU)

(72) Inventors: Minjeong Shin, Kent Town (AU); Dongwoo Kim, Kent Town (AU); Jae Hee Lee, Kent Town (AU); Umanga Bista, Kent Town (AU); Lexing Xie, Kent Town (AU)

(73) Assignee: Fivecast Pty Ltd, Kent Town (AU)

( * ) Notice: Subject to any disclaimer, the term of this patent is extended or adjusted under 35 U.S.C. 154(b) by 417 days.

(21) Appl. No.: 17/413,405

(22) PCT Filed: Dec. 19, 2019

(86) PCT No.: PCT/AU2019/000159
§ 371 (c)(1),
(2) Date: Jun. 11, 2021

(87) PCT Pub. No.: WO2020/124124
PCT Pub. Date: Jun. 25, 2020

(65) Prior Publication Data
US 2022/0067273 A1    Mar. 3, 2022

(30) Foreign Application Priority Data
Dec. 19, 2018    (AU) .................................. 2018904826

(51) Int. Cl.
*G06F 40/295* (2020.01)
*G06F 40/194* (2020.01)
*G06T 11/20* (2006.01)

(52) U.S. Cl.
CPC .......... *G06F 40/194* (2020.01); *G06F 40/295* (2020.01); *G06T 11/206* (2013.01)

(58) Field of Classification Search
CPC .. G06F 16/387; G06F 16/487; G06F 16/9024; G06F 40/279; G06F 40/295; G06T 11/206; G06T 17/05; G06T 7/162
(Continued)

(56) References Cited

U.S. PATENT DOCUMENTS 6,774,899 B1 * 8/2004 Ryall .................... G06T 11/206
                                                        345/440
9,036,000 B1 * 5/2015 Ogale ................... G06T 3/0062
                                                        348/36
(Continued)

FOREIGN PATENT DOCUMENTS

WO    2015121805 A1    8/2015

OTHER PUBLICATIONS

Akcora et al., "Network and Profile Based Measures for User Similarities on Social Networks", 2011 IEEE International Conference on Information Reuse & Integration, Aug. 3-5, 2011, pp. 292-298. (Year: 2011).*

(Continued)

*Primary Examiner* — Martin Lerner
(74) *Attorney, Agent, or Firm* — McDonnell Boehnen Hulbert & Berghoff LLP

(57) ABSTRACT

A computer-implemented method and data display system for identifying and visualizing differences between a first set comprising one or more text items and a second set comprising one or more text items is disclosed. The method includes extracting a collection of named entities from the first and second sets of one or more text items, generating a composite graph structure from the collection of named entities, the composite graph structure configured to display differences between the first and second set of text items and then displaying spatially the composite graph structure.

22 Claims, 8 Drawing Sheets

(58) Field of Classification Search
USPC .................................. 704/1, 9, 276; 715/215
See application file for complete search history.

(56) References Cited

U.S. PATENT DOCUMENTS

| | | | | |
|---|---|---|---|---|
| 9,558,265 | B1* | 1/2017 | Tacchi | G06F 16/9024 |
| 9,892,533 | B1* | 2/2018 | Tressler | G06T 11/206 |
| 10,055,435 | B2* | 8/2018 | Leiba | G06F 16/9024 |
| 10,643,355 | B1* | 5/2020 | Osofsky | G06F 40/284 |
| 11,032,303 | B1* | 6/2021 | Efstathopoulos | G06F 16/9024 |
| 11,853,713 | B2* | 12/2023 | Chen | G06F 16/9024 |
| 2010/0063785 | A1* | 3/2010 | Pich | G06T 11/206 |
| | | | | 703/6 |
| 2014/0280108 | A1* | 9/2014 | Dunn | G06F 16/9535 |
| | | | | 707/728 |
| 2015/0351068 | A1* | 12/2015 | Deleeuw | H04L 67/52 |
| | | | | 455/456.1 |
| 2016/0358021 | A1* | 12/2016 | Hong | G06T 7/60 |
| 2016/0364486 | A1* | 12/2016 | Mall | G06F 16/9535 |
| 2018/0032506 | A1* | 2/2018 | Malhotra | G06F 40/30 |
| 2018/0068406 | A1* | 3/2018 | Van De Sande | G16H 70/00 |
| 2018/0165302 | A1* | 6/2018 | Tanglertsampan | G06F 16/29 |
| 2018/0322667 | A1* | 11/2018 | Yap | G06T 11/206 |
| 2018/0336283 | A1* | 11/2018 | Mukherjee | G06F 16/9535 |
| 2020/0073932 | A1* | 3/2020 | Jia | G06F 40/30 |

OTHER PUBLICATIONS

Shin et al., "Visualizing Graph Differences from Social Media Streams", WSDM '19: Proceedings of the Twelfth ACM International Conference on Web Search and Data Mining, Feb. 11 to 15, 2019, pp. 806 to 809. (Year: 2019).*

Daniel Archambault: "Structural Differences Between Two Graphs through Hierarchies", Proceedings of Graphics Interface, vol. 09, May 20, 2009 (May 20, 2009), pp. 87-94.

European Patent Office, Extended European Search Report for App. No. 19900674.3, mailed Aug. 16, 2022, (11 Pages).

International Search Report mailed on Feb. 25, 2020, issued in connection with International Application No. PCT/AU2019/000159, filed on Dec. 19, 2019, 4 pages.

Written Opinion mailed on Feb. 25, 2020, issued in connection with International Application No. PCT/AU2019/000159, filed on Dec. 19, 2019, 4 pages.

Archambault; Daniel, "Structural Differences Between Two Graphs through Hierarchies", Graphics Interface Conference 2009, May 2009, pp. 87-94.

Frishman et al., "Dynamic Drawing of Clustered Graphs", IEEE Symposium on Information Visualization 2004, Oct. 10-12, 2004, pp. 191-198.

Porta et al., "The Network Analysis of Urban Streets a Primal Approach", Physics and Society, Jun. 2005, 19 pages.

* cited by examiner

METHOD AND SYSTEM FOR IDENTIFYING AND VISUALIZING DATA DIFFERENCES BETWEEN DATA SETS

PRIORITY DOCUMENTS

The present application is a U.S. National Phase Application under 35 U.S.C. § 371 of International Application No. PCT/AU2019/000159 filed on 19 Dec. 2019, which claims priority from Australian Provisional Patent Application No. 2018904826 titled "METHOD AND SYSTEM FOR DATA DIFFERENTIATION" and filed on 19 Dec. 2018, the contents of which are incorporated by reference in their entirety.

TECHNICAL FIELD

The present disclosure relates to the analysis of textual information in electronic form. In one aspect, the present disclosure relates to computational tools for identifying and visualizing differences between two different sets of textual information.

BACKGROUND

With the advent of the Internet and in particular the use of social media platforms, online blogging and content aggregators, the production and publication of content has been made accessible to anyone with online access. In addition, traditional sources of information such as the mainstream media and the like now commonly publish material online. This has led to a deluge of electronically published material. As an example, the social media platform Twitter™ is responsible for some 500 million tweets per day.

An important issue with those tasked to monitor and interpret online content, and other sources of textual information, is how to quantify and interpret the differences between two groupings of textual information that are said to differ on some basis but are also related. One example is two groupings or sets of textual information said to be on the same topic but arising from different sources, or having different authors or perhaps arising from the same source but at different times. One example that is of concern to law enforcement and national security agencies is comparing the social media posts of an entity over time to determine whether there has been a change that might signify there is now an enhanced risk associated with that entity. Formulators of social policy, and those concerned with attempting to predict the behavior of social groups, are also concerned to be able to identify what differences may be discerned on the basis of available textual sources.

Providing an automated visual comparison, which is also quantifiable and reproducible, is one way to identify differences between different groups of textual information. One example to at least provide some sort of a computed visual representation of a document is the concept of a "word cloud". This is where a document's most common words are processed and plotted in a two-dimensional space with the word's frequency indicated by the font size of the word. However, while providing a visual summary of textual information, computer generated word clouds do not readily assist in comparing two different groups of textual information. One attempt to address this has been the use of computer generated "word storms" where similar documents are configured to at least have visually similar word clouds, however, this approach fails to capture the relationships or linkages between words and how this "topology" might differ between the two different groups of textual information.

It is against this background that there is therefore a need for computational tools to identify and visualize the differences between different groups of textual information.

SUMMARY

In a first aspect, the present disclosure provides a computer-implemented method for identifying and visualizing differences between a first set comprising one or more text items and a second set comprising one or more text items, the method comprising:
    extracting a collection of named entities from the first and second sets of one or more text items;
    generating a composite graph structure from the collection of named entities, the composite graph structure configured to display differences between the first and second set of text items; and
    displaying spatially the composite graph structure.

In another form, generating a composite graph structure comprises:
    assigning a node to each named entity from the collection of named entities;
    determining whether there is a relationship or connection between respective pairs of nodes and defining an edge between those pairs of nodes where a relationship has been determined;
    determining a first group of nodes corresponding to named entities exclusively from the first set of text items:
    determining a second group of nodes corresponding to named entities exclusively from the second set of text items;
    determining a third group of nodes corresponding to named entities from both the first and second set of text items; and
    determining associated node spatial locations for each of the nodes for displaying the differences between the first and second sets of text items.

In another form, determining associated node spatial locations for each of the nodes of the composite graph structure comprises determining the node spatial locations in accordance with a force-directed model.

In another form, determining the node spatial locations in accordance with a force-directed model includes subjecting the node spatial locations to a constraint that an intragroup edge length of edges that connect pairs of nodes in the same group is less than an intergroup edge length of edges that connect pairs of nodes in different groups.

In another form, determining the node spatial locations in accordance with a force-directed model includes subjecting all nodes to a repulsive force operating on all nodes to generally force them apart.

In another form, determining the node spatial locations in accordance with a force-directed model includes subjecting all connected nodes to an attractive force to generally attract the respective pairs of connected nodes together.

In another form, determining the node spatial locations in accordance with a force-directed model includes subjecting the first group of nodes and the second group of nodes to a group repulsive force operating to force the first and second groups of nodes in opposite directions from each other.

In another form, determining the node spatial locations in accordance with a force-directed model includes iterating the model over a number of iterations to determine final node spatial locations.

In another form, a node having an associated geographical location is subject to an initial overriding constraint that the associated determined node spatial location is representative of the geographical location.

In another form, determining whether there is a relationship or connection between respective pairs of nodes includes determining whether the respective pair of nodes occurs in a text segment.

In another form, determining whether there is a relationship or connection between respective pairs of nodes includes determining whether the respective pairs of co-occurring nodes have an entity relationship defined by the text segment In another form, one or more text items of the first or second set of text items comprises a structured text item, the structured text item including two or more named entities connected by a relationship In another form, the first set of text items comprises one or more social media posts originating from a social medial account on a social media platform for a first time period and the second set of text items comprises further social media posts originating from the social media account for a second time period.

In another form, the first set and second sets of text items concern the same topic.

In a second aspect, the present disclosure provides a data display system for identifying and visualizing differences between a first set comprising one or more text items and a second set comprising one or more text items, the method comprising:

an entity extraction module comprising one or more processors for extracting a collection of named entities from the first and second sets of one or more text items;

a composite graph structure generating module comprising one or more processors for generating a composite graph structure from the collection of named entities, the composite graph structure configured to display differences between the first and second set of text items; and an electronic display for displaying spatially the composite graph structure.

In another form, the composite graph structure generating module comprises:

a node assignment module for assigning a node to each named entity from the collection of named entities;

an edge determination module for determining whether there is a relationship or connection between respective pairs of nodes and defining an edge between those pairs of nodes where a relationship has been determined;

wherein the node assignment module further determines:

a first group of nodes corresponding to named entities exclusively from the first set of text items;

a second group of nodes corresponding to named entities exclusively from the second set of text items; and a third group of nodes corresponding to named entities from both the first and second set of text items; and a node spatial location determination module for determining associated node spatial locations for each of the nodes for displaying the differences between the first and second sets of text items.

In another form, determining associated node spatial locations for each of the nodes of the composite graph structure comprises determining the node spatial locations in accordance with a force-directed model.

In another form, determining the node spatial locations in accordance with a force-directed model includes subjecting the node spatial locations to the constraint that an intragroup edge length of edges that connect pairs of nodes in the same group is less than an intergroup edge length of edges that connect pairs of nodes in different groups.

In another form, determining the node spatial locations in accordance with a force-directed model includes subjecting all nodes to a repulsive force operating on all nodes to generally force them apart.

In another form, determining the node spatial locations in accordance with a force-directed model includes subjecting all connected nodes to an attractive force to generally attract the respective pairs of connected nodes together.

In another form, determining the node spatial locations in accordance with a force-directed model includes subjecting the first group of nodes and the second group of nodes to a group repulsive force operating to force the first and second groups of nodes in opposite directions from each other.

In another form, determining the node spatial locations in accordance with a force-directed model includes iterating the model over a number of iterations to determine final node spatial locations.

In another form, a node having an associated geographical location is subject to an initial overriding constraint that the associated determined node spatial location is representative of the geographical location.

In another form, determining whether there is a relationship or connection between respective pairs of nodes includes determining whether the respective pair of nodes occurs in a text segment.

In another form, determining whether there is a relationship or connection between respective pairs of nodes includes determining whether the respective pairs of co-occurring nodes have an entity relationship defined by the text segment.

In another form, one or more text items of the first or second set of text items comprises a structured text item, the structured text item including two or more named entities connected by a relationship.

In another form, the first set of text items comprises one or more social media posts originating from a social medial account on a social media platform for a first time period and the second set of text items comprises further social media posts originating from the social media account for a second time period.

In another form, the first set and second sets of text items concern the same topic.

In a third aspect, the present disclosure provides a data display system for identifying and visualizing differences between a first set of text items and a second set of text items, the system comprising:

one or more processors; and a memory for storing one or more programs, wherein when the one or more programs are executed by the one or more processors, the one or more processors are enabled to implement the method according to the first aspect.

In a fourth aspect, the present disclosure provides a non-transitory computer-readable medium for identifying and visualizing differences between a first set of text items and a second set of text items, comprising instructions stored thereon, that when executed on a processor, perform the steps of the method according to the first aspect.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
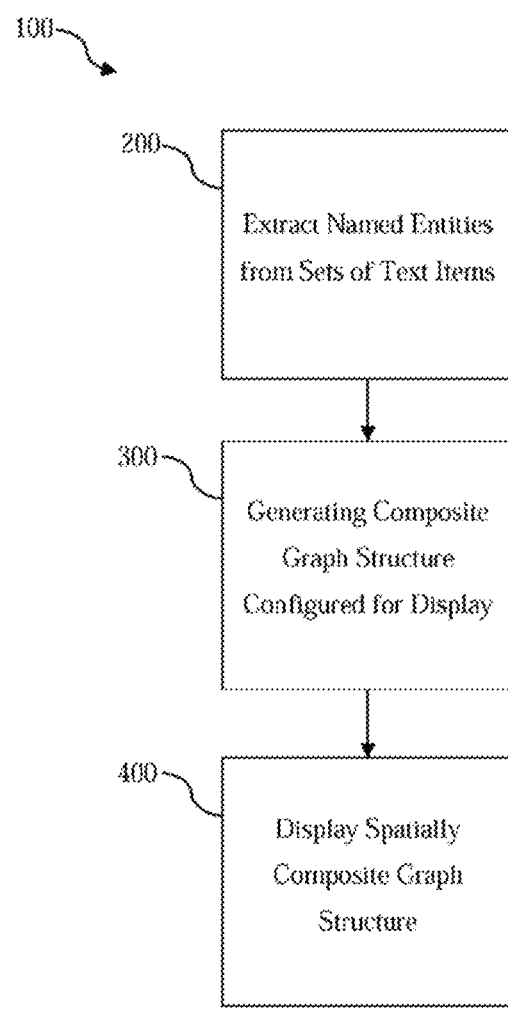
FIG. 1 is a flowchart of a method for identifying and visualizing differences between first and second sets of textual information in accordance with an illustrative embodiment.

Referring now to FIG. 1, there is shown a flow chart of a method 100 for identifying and visualizing differences between first and second sets of textual information according to an illustrative embodiment. In this example, method 100 is directed to reviewing and comparing a first set of text items with respect to a second set of text items. In this specification, the term "text item" is defined to mean a grouping of one or more words in electronic form arising from a semantic or logical relationship between the words. As an example, a "text item" may include, but is not limited to, a sentence, an article, a book, a social media post, a word, a command, a phrase or a title.

In another example, the text items may be derived from commands, actions and user interactions carried out by users of social media including, but not limited to, a user liking, sharing, or commenting on a post, a user bookmarking a mention of an entity, or a user following another user.

In another example, the text item may be a structured text item that comprises two or more identified entities and an indicator of the one or more identified relationship between the entities. In one application directed to social media applications, the structured text item may comprise a pair of entities corresponding to social media user names and the identified relationship may comprise a social media interaction between the identified entities including, but not limited to: "following", "unfollowing" "liking", "mentioning", "commenting". "sharing", "linking to" or "replying to". As would be appreciated, these social media interactions may also be defined at a more granular level and relate to interactions regarding particular social media items (eg, "liking_a_post", "liking_an_image", "liking_a_video", etc).

In another example, the text items may be derived from post-processing visual information such as images or videos where the textual description is determined by image classification and object recognition that operates to provide textual information corresponding to the objects in the image and their relationships.

Figure 2:
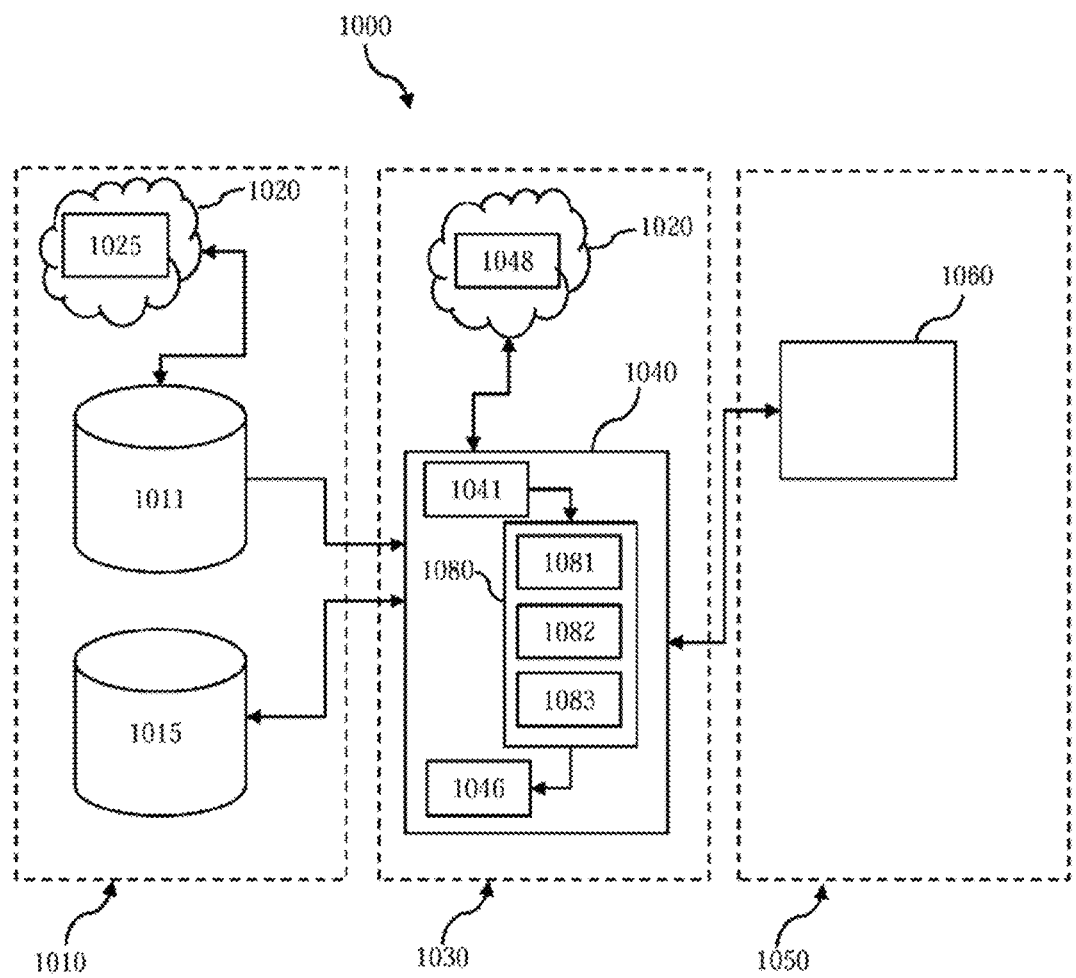
FIG. 2 is a system overview diagram of a data display system for identifying and visualizing differences between first and second sets of textual information in accordance with an illustrative embodiment.

Referring also to FIG. 2, there is shown a system overview diagram of a data display system 1000 which in one embodiment is configured to implement the method 100 for identifying and visualizing differences as illustrated in FIG. 1. By way of overview, data display system 1000 includes a data layer or subsystem 1010, a logic or processing layer or subsystem 1030 comprising an electronic or computer processor 1040 for generating the composite graph structure which itself may comprise one or more processors and a spatial display layer or subsystem 1050 comprising an electronic spatial display apparatus 1060.

Data layer 1010 in this example comprises a first logical data store 1011 storing the input text for processing by processing layer 1030 and a second logical data store 1015 for storing the composite graph structure generated by processing layer 1030 which is eventually displayed by spatial display layer 1050 as will be described below.

A set of text items is any grouping of one or more individual text items. This grouping may be selected automatically according to predetermined criteria, eg, the set of all social media posts by a particular user in the time period 1 Jan. 2018 to 30 Jun. 2018, or arises as a result of a categorization or classification exercise by a human operator in relation to a topic of interest, eg, a list of all the public statements in a predetermined time period by a selected entity about a selected topic, or a combination of both human and machine classification operations. In one non limiting example, the text items may be sourced from the Internet 1020 and in particular from one or more social media platforms 1025 (as shown in FIG. 2). Exemplary social media platforms include, but are not limited to, Reddit™, Google+™, Twitter™ and LinkedIn™.

As an example, in one embodiment a first set of text items may comprise the social media posts originating from a social media account such as "tweets" originating from a Twitter™ account for a first predetermined period of time and the second set of text items may comprise the social media posts or tweets originating from the same account for a second predetermined period of time. In another example, the first and second sets of text items could be social media posts or tweets for the same predetermined period of time but originating from different Twitter™ accounts.

In yet another example, the first and second sets could each comprise a single text item where each text item is an article concerning a selected topic or subject matter created in the same predetermined period of time but the respective articles are from different authors. In a further example, there may be multiple articles concerning the selected topic in the set of text items but they differ as to when the articles were created or the first set may be articles from mainstream media concerning a certain topic and the second set comprise social media posts concerning the same topic.

In yet another example, the first set of text items could comprise press releases concerning a selected topic from one political party and the second set of text items comprises press releases concerning the same topic from an opposing political party. In one example, the set of text items could comprise articles concerning an election in a given country originating in the country of the election where the second set comprises articles concerning the same election but originating from outside the country.

At step 200, a collection of named entities is extracted from the first and second sets of text items. Referring to FIG. 2, this extraction is carried out by entity extraction module 1041 forming part of computer processor 1040 processing the stored textual information in logical data store 1011.

In this example, a named entity is a real world object that may be further classified under a named entity type such as a person, place, organization or object. For example, from the text item comprising the sentence "Einstein was born in Germany and studied at the UZH.", three named entities may be extracted as follows:

Einstein→Albert_Einstein (Person)
Germany→Germany (Place)
UZH→University_of_Zurich (Organization)

In this formalism, the named entities correspond to individual words in the text item. The word "Einstein" has been recognized as the named entity "Albert_Einstein" having an entity type "Person". Similarly, the word "Germany" has been recognized as the named entity "Germany" having an entity type "Place" and the word UZH has been recognized as the named entity "University_of_Zurich" having an entity type "Organization".

In one example, entity extraction module 1041 employs the entity extraction tool DBpedia Spotlight which functions to receive unstructured text (eg, from data store 1011) as an input and extract named entities that have a corresponding page in Wikipedia and additionally classifies the named entity as an entity type such as person or place. In one example, the named entity types include, "Person", "Place" and "Organization" as described above and other named entities that do not fall within these classifications are given the entity type "Other".

In another example, entity extraction module 1041 is configured to employ the Stanford NER entity extraction tool. In this example, the Stanford NIR tool annotates categories of extracted entities with named entity types such as location, people. organization city, country, cause_of_death, criminal charge, email, ideology. nationality, religion, state_or_province or uniform resource locator (URL). This tool may be used for any textual information in general but works optimally with textual information having the semantic complexity and detail corresponding to a newspaper level article.

As would be appreciated, an entity extraction tool such as described above may be implemented as an application programming interface (API) for access by a high level language such as Java or Python as implemented in entity extraction module 1041 and configured to access an Internet 1020 based server 1048 as depicted in FIG. 2 which when presented with a text item will return a collection of named entities from the text item.

In another example, entity extraction module 1041 employs the Open Information Extraction (OpenIE) entity extraction tool which is powered by the Stanford NER tool referred to above. OpenIE not only extracts named entities as described above but also can determine whether there is an entity relationship between the named entities (see below). As the OpenIE tool will generally attempt to extract all possible candidate named entities and associated entity relationships from the input text item, further filtering may be required in order to determine whether a relevant link has been established between a pair of named entities.

In one illustrative embodiment, the type or types of named entity that are to be extracted from the text items are specified. As an example, only named entities of the type "person" may be extracted from each set of text items. As would be appreciated, the selection of different "types" of named entities may be customized depending on the analysis task and domain knowledge.

Figure 3:
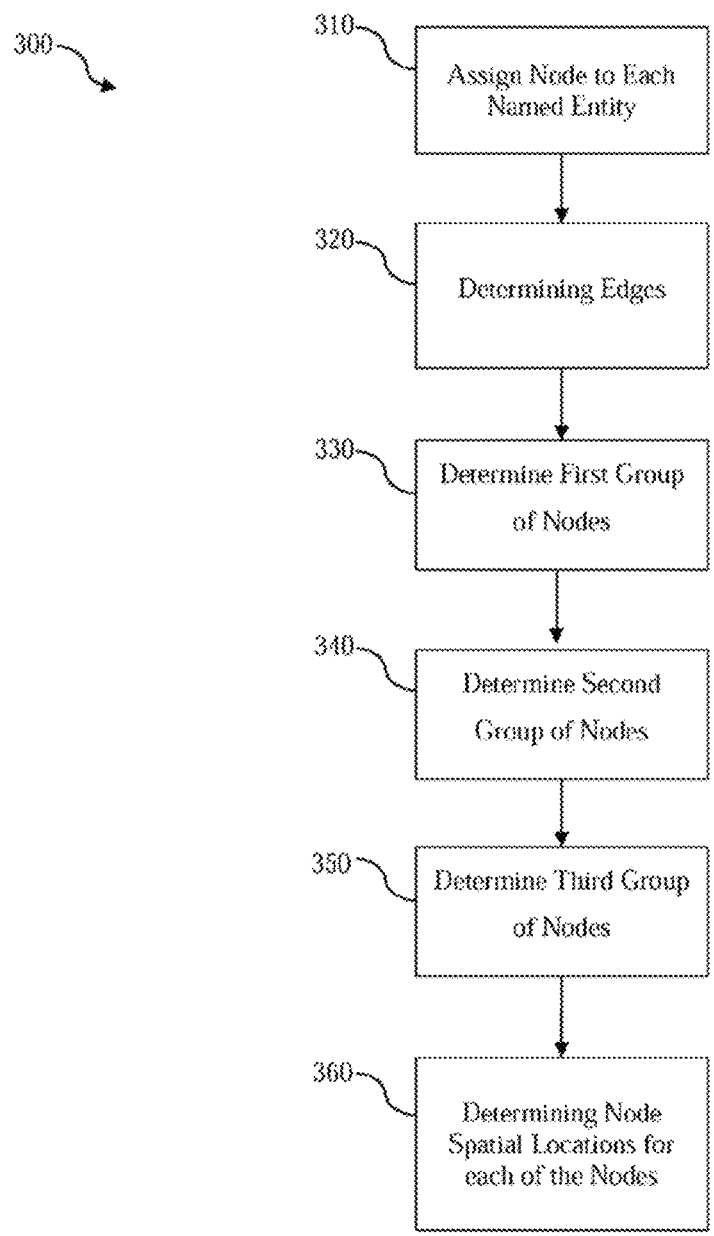
FIG. 3 is a flowchart of a method for generating a composite graph structure in accordance with an illustrative embodiment.

At step 300, following the extraction of the collection of named entities, a composite graph structure is formed. Referring again to FIG. 2, in exemplary data display system 1000 this step is carried out by a composite graph structure generating module 1080 forming part of the functionality of computer or data processor 1040. Referring now to FIG. 3, there is shown the steps involved in forming the composite graph structure according to an illustrative embodiment.

At step 310, generating the composite graph structure, by in one example composite graph structure generating module 1080 involves first assigning a node to each named entity. Referring again to FIG. 2, in exemplary data display system 1000 this step is carried out by node assignment module 1081 forming part of the functionality of composite graph structure generating module 1080 implemented on computer processor 1040. In one example, the composite graph structure includes a "node_id" that is assigned to each node being a unique identifier indicating the corresponding node. In another example, the composite graph structure includes "node_named_entity" and/or "node_type" parameters for each node that correspond to the associated named entity and the type of named entity that have been determined and assigned for each node.

At step 320, a determination is made whether there is a relation or connection between respective pairs of nodes and where this relation is established then defining there to be an edge between the respective pair of related or connected nodes. Referring again to FIG. 2, in exemplary data display system 1000 this step is carried out by edge determination module 1082 forming part of the functionality of composite graph structure generating module 1080 implemented on computer processor 1040.

In one illustrative embodiment, determining whether there is a relation, connection or link between two nodes that correspond to respective named entities that occur in one or both sets of text items involves determining where the named entities are used or occur in the same text segment. In this example, a text segment comprises a sequence of words present in a text item where the text item may be from any one of the first or second groups of text items.

In one example, a text segment may be a sentence, ie, a sequence of words starting with a capitalized word and terminating with an end of sentence punctuation marker. In another example, where the text item may be a larger body of text such as an article or the like, the text segment may be the sequence of words comprising a paragraph of text or phrase. Where the text item corresponds to a social media interaction on a social media platform, the text segment may correspond to an action taken on the social media platform, eg Alice Jones LIKES Post by Bob Smith on TIMESTAMP, Bob Smith SHARES Article TITLED "Cleaning your Shed" on TIMESTAMP, Bob Smith REPLIES Alice's post on TIMESTAMP, etc, where the TIMESTAMP indicates the time that the social media interaction occurred.

Following a determination that the named entities co-occur in the same text segment, in this illustrative example, an edge is defined to extend between the two nodes corresponding to the named entities that co-occur. In one example, the composite graph structure may include an "edge_id" parameter corresponding to a unique identifier for each edge.

In another illustrative embodiment, determining whether there is a relation, connection or link between two nodes involves determining where the named entities corresponding to the nodes not only co-occur in the same text segment but also have an entity relationship between the named entities defined in the text segment where the entity relation is selected from a number of entity relation types. In one example, the composite graph structure may include for each edge an "edge_type" parameter corresponding to the type of edge, ie, whether it is directed (ie, indicating a relationship between the nodes as discussed below) or undirected.

For example, given two named entities, eg, Albert_Einstein and Germany, corresponding to nodes in the composite graph structure which co-occur in the same text segment, there is also a relation between these entities which in this case would be that the named entity Albert_Einstein was born in the named entity Germany. In this case, the edges defined by the entity relationship have a direction based on the type of relation moving from the "subject" or "source" of the entity relationship to the "object" or "target" of the entity relationship. Using the above example, Albert Einstein is the subject or source node and "Germany" is the object or target node, and the entity relationship is "is_born_in".

In this manner, the composite graph structure may also include for each edge a parameter "edge_relationship" characterizing the entity relationship forming the basis for the edge. In another example, the edge will not only include a reference to the pair of nodes defined by the edge but also parameters that identify which node of the pair of nodes is the subject of the entity relationship and which is the object of the entity relationship. Accordingly, in one illustrative example, the composite graph structure includes for each edge, both "edge source_node_id" and "edge target node_id" corresponding to the source "node_id" and the target "node_id" for the edge. In the case where the "edge_type" is undirected, whether a node is the source or target node of an edge may be assigned arbitrarily.

In one example, a distance supervision (DS) method is employed to determine entity relations between named entities where the DS method builds a multi-class classifier trained on external knowledge bases. In this embodiment, the training procedure takes a set of sentences containing a pair of named entities as an input. The model then looks up an external knowledge base where the relations between the pair of entities are partially known, which is then used as an output of the multi-class classification model. Put another way, if the knowledge base contains the triple (entity1, entity2, relation) then the sentences containing those two entities are treated as a positive example for the corresponding relation.

Following is an illustrative example how the DS method may be applied. First, assume that the external knowledge base already knows that there is a "born-in" relationship between the named entity Albert Einstein and the named entity Germany. Second, all sentences containing the pair of named entities from a training document corpus are extracted. Assume for illustrative purposes that two sentences below are extracted from the training document corpus:

Albert Einstein was born in Germany
Albert Einstein left Germany in 1933

It is known that only Sentence 1 is a positive example of the "born-in" relationship and Sentence 2 is a noisy example which does not represent the "born in" relationship. However, it is not known which sentences are positive examples among all sentences containing both entity Albert_Einstein and Germany without manual labelling of each sentence, which as would be appreciated, requires expensive manual labelling by human experts. The central assumption of the DS method is that a classification model may be approximately trained using both positive and noisy examples instead of using exact positive examples which require additional labelling. This approximation may be adopted because at least one of these sentences contains a positive example, and there are other named entity pairs which have the "born in" relationship, eg, Isaac Newton and England, present in more sentences some of which potentially can be extracted and which represent the "born-in" relationship as well.

In this illustrative example, the relationship, connection or link is a pairwise relationship between the named entities corresponding to the respective nodes. As would be appreciated, one or more pairwise relationships may be selected for the particular analysis task taking into account domain knowledge in relation to the text items that are being compared and the analysis task. Following is a non-exhaustive list of pairwise relations that may apply to two named entities. These include, but are not limited to:

contains;
is_born_in;
neighborhood_of;
capital_of;
founder_of;
member_of;
company_advised;
language_spoken_by;
religion_of;
place_founded_by;
owner_of;
ethnicity_of;
included_in_group;
nationality_of;
place_of_burial_of;
geographic_distribution_for;
place_lived_by;
major_shareholder_of;
parent_company_of;
profession_of;
child_of;
endorses;
opposes;
shares;
likes; or
comments_on.

In one illustrative example, the composite graph structure includes an "edge_time_stamp" parameter having a value corresponding to a time value that can be determined for the entity relationship corresponding to the edge. In one example, where the different sets of text items correspond to items that were generated at different times, then the edge_time_stamp will be the time value associated with each set of text items when there is an edge or connection exclusively between nodes in the relevant set whose time stamp is adopted.

As an example, for two different sets of text items where the first set correspond to articles generated in January 2018 and the second set correspond to articles generated in June 2018 then an edge between any pair of nodes that are exclusively in the January 2018 set will be assigned the "edge_time_stamp" of January 2018 while an edge between any pair of nodes that are exclusively in the June 2018 set will be assigned the "edge_time_stamp" of June 2018.

Where there is more than one edge between a pair of nodes, then each edge may be assigned a different "edge_time_stamp" depending on circumstances.

In one example, the composite graph structure includes a "node_degree" parameter for each node which is set to be the number of connections or edges between each node and other nodes that have been determined.

In the example where the text item is a structured text item as referred to above where the entities and their relationship are already identified, the extraction of named entities may be based on the identified entities which may then be assigned a node (see step 310 of FIG. 3) and the edges may be determined based on the identified relationships in the structured text item (see step 320 of FIG. 3).

At step 330, a first group of nodes is determined corresponding to the named entities that lie exclusively in the first set of text items.

At step 340, a second group of nodes is determined corresponding to the named entities that lie exclusively in the second set of text items.

At step 350, a third group of nodes is determined corresponding to the named entities that lie in both the first and second set of text items, ie the intersection of named entities that come from both first and second sets of text items. Referring again to FIG. 2, for exemplary data display system 1000, steps 330, 340 and 350 are carried out by node assignment module 1081 forming part of the functionality of composite graph structure generating module 1080 implemented on computer processor 1040.

In one example, where the first set of text items are generated in a first time period and the second set of text items have been generated in a second time period and the differences between the two sets are being sought to be identified, the approach exemplified by the following pseudo code may be adopted:

```
//determine first, second and third group of nodes
for each edge e(u, v) where u, v∈nodes
    if time(e(u, v))∈first period of time
        put u and v in the first group
    endif
    if time(e(u, v))∈second period of time
        put u and v in the second group
    endif
endfor
third(common) group=first group∩second group
first group=first group−third(common) group
second group=second group−third(common) group
```

As can be seen from above, in this example the determination whether a node lies in one of the three groups is determined by determining a time parameter or value associated with the edge between the respective nodes as the different sets of text items arise from two different time periods.

More generally, if the first set of text items characterised by a first property and the second set of text items is characterised by a second property (eg, first set of text items are articles from BBC and the second set of text items are articles from CNN), then the following pseudo code may be adopted:

```
//determine first, second and third group of nodes
for each edge e(u, v) where u, v∈nodes
    if property(e(u, v))∈first group property
        put u and v in the first group
    endif
    if property(e(u, v) u)∈second group property
        put u and v in the second group
    endif
endfor
third(common) group=first group∩second group
first group=first group−third(common) group
second group=second group−third(common) group
```

As can be seen from above, determining whether nodes belong to the first, second and third groups may be determined by first checking whether an edge connecting two nodes has a property or characterizes the connected nodes as being in a non-exclusive version of the first or second groups and then determining the nodes that are common to both of these non-exclusive versions of the first or second groups. The third group then corresponds to the nodes that are common to non-exclusive versions of the first and second groups and the first and second groups are then defined by removing the common nodes from the non-exclusive versions of the first and second groups respectively.

This process is shown in the following non-limiting example. Consider a first set comprising a text item composed of an article from a first news source which has the following pairs of connected nodes:
 (Trump—Australia),
 (Trump—USA), and
 (Obama—USA).

Now consider a second set comprising a text item composed of an article from a second news source which has the following pairs of connected nodes:
 (Obama—USA),
 (Obama—UN),
 (Trump—Canada),
 (Canada—UN)

In this example, determining the nodes in the first non-exclusive group would identify the nodes (Trump, Australia, USA, Obama) and determining the nodes in the second non-exclusive group would identify the nodes (Obama, USA, UN, Trump, Canada). The nodes common to both of these groups (ie the intersection of these non-exclusive groups) is then determined as (Trump, USA, Obama) which is defined to be the third group and then the first and second groups are defined by removing the common nodes from the first non-exclusive group and the second non-exclusive group respectively resulting in the first group being determined to be (Australia) and the second group determined as (UN, Canada) resulting in:
 First Group of Nodes (Australia)
 Second Group of Nodes (UN, Canada)
 Third Group of Nodes (Trump, USA, Obama)

In one example, the composite graph structure further includes a "node_group_id" for each node indicating which of the first second or third groups the node has been determined to be in.

At step 360, node spatial locations are determined for each of the nodes of the composite graph structure which are determined to display the differences between the first and second sets of text items. These node spatial locations allow the nodes to be spatially displayed using a display interface and depending on the type of display may take the form of co-ordinates in 2-dimensions (2D), eg, for a standard computer screen, or in 3-dimensions (3D), eg again for a standard computer screen and/or for a virtual reality display.

Referring again to FIG. 2, in exemplary data display system 1000 this step is carried out by node spatial location determination module 1083 forming part of the functionality of composite graph structure generating module 1080 implemented on computer processor 1040 which operates with display driver 1046 to generate relevant display information for display 1060.

Figure 4:
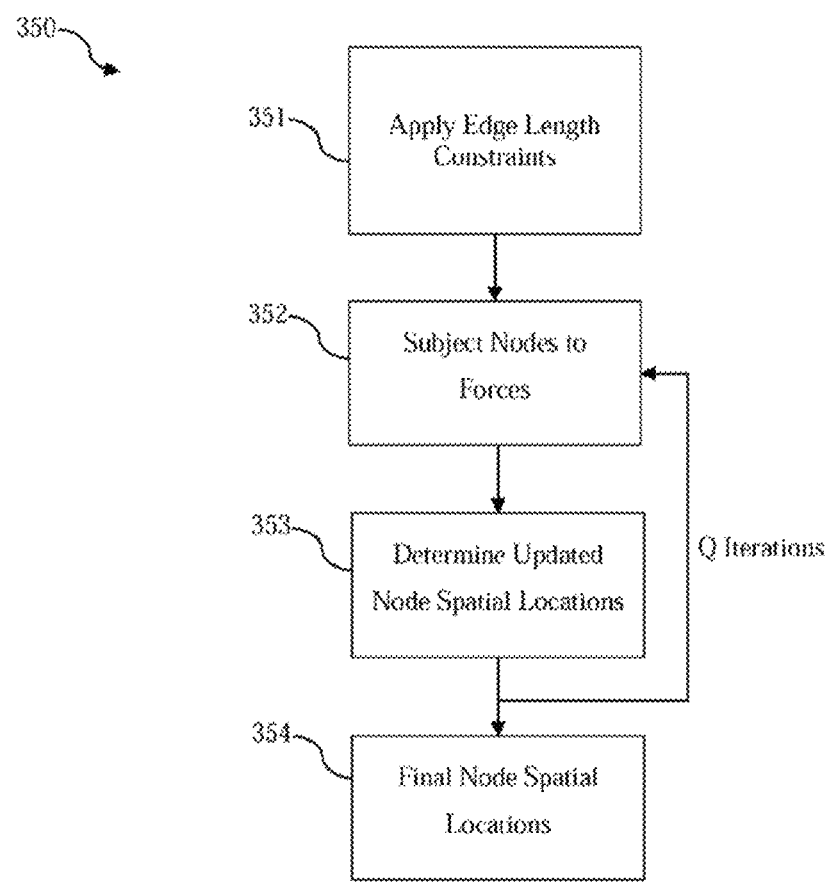
FIG. 4 is a flowchart of a method for determining the node spatial locations for the nodes of the composite graph structure in accordance with an illustrative embodiment.

Referring now FIG. 4, there is shown a flowchart of a method 350 for determining the node spatial locations for the nodes of the composite graph structure according to an illustrative embodiment. In this example, the node spatial locations are determined by a force-directed model which operates to simulate the application of different physical forces simultaneously to the nodes to achieve an overall positioning of the node spatial locations.

At step 351, edge length constraints are applied to the node spatial locations. These constraints function to limit the potential position and movement of the nodes under the force-directed model. In one example, the node spatial locations are subject to the constraint that an intragroup edge length of edges that connect pairs of nodes in the same group is less than an intergroup edge length of edges that connect pairs of nodes in different groups. In one example, the initial edge lengths between the pairs of nodes are determined as an initial condition.

In one example, all edges between respective pairs of nodes in the same group of nodes are initialized to have a predetermined length which is less than the predetermined length set for all edges joining a pair of nodes that are members of different groups. In accordance with this approach, the initial edge length for an edge between two nodes that lie exclusively in the first group, second group or third group is initialized to be less than the initial edge length for an edge between, as an example, a node in the first group and a node in the third group.

Exemplary pseudo code to implement this approach is set out below:

```
// Set initial edge distance
for each edge e(u,v)
    if group(u)==group(v) // if u and v are in the same group
        e(u,v).length=short
    else
        e(u,v).length=long
    endif
endfor
```

Having determined the initial edge length constraints that the force-directed model will be subject to the various forces that the nodes will be subjected to, may now be determined.

At step 352, a variety of forces are applied to the nodes in a physics based simulation subject to the edge length constraints referred to above. In this example, the nodes are subjected to four different forces which are applied in a 2-dimensional coordinate system to determine the node spatial locations.

The first force is termed the collision force and effectively treats each node as a circle having a minimum predetermined radius and which functions to prevent the position of respective nodes from overlapping. In one example, the size of the minimum predetermined radius is dependent on the node_degree parameter so that the size of the node will increase with the number of connections to the node. In another example, the collision force includes a padding force effectively extending the minimum predetermined radius to which the collision force applies.

The second force is a repulsive force which in this embodiment is configured to act between all pairs of nodes and operates to generally force all nodes apart. In this example, the repulsive force is configured to simulate the electromagnetic repulsive force experienced by electromagnetic charges of the same charge.

The third force is an attractive force which in this embodiment is configured to act between all pairs of connected nodes, ie those nodes having an edge extending between them. In this example, the attractive force is configured to simulate the gravitational attractive force experienced by bodies due to the effect of gravity.

The fourth force is a centering force which in this embodiment is configured to translate the position of nodes uniformly so that the overall mean position of all nodes (the center of mass if all nodes have equal weight) is towards the center of the display area.

The fifth force is a group repulsing force which is an additional repulsive force operating to move the two exclusive node groups (ie, the first and second groups of nodes) in opposite directions from each other. In one example, directed to determining node spatial locations in 2-dimensional space the group repulsing force functions to effectively force the first group of nodes to the left and the second group of nodes to the right of the display area.

As would be appreciated, the relative strength of the forces may be adjusted to depending on display requirements. As an example, a stronger repulsive force may be adopted which will generally function to spread the node spatial locations over the display area.

In this example, the force based simulator is based on a velocity Verlet numerical integrator for simulating physical forces on particles assuming a constant unit time step (ie, $\Delta t=1$) for each step and a constant effective unit mass (ie, $m=1$) for all nodes. As a result, in this example a force, F, acting on a node is equivalent to a constant acceleration a over the time interval which can be simulated simply by adding to the particle's velocity which in turn is then added to the particle's position. As would be appreciated, a force-directed model may be solved by appropriate computational physics based simulation tools.

This is exemplified by the following pseudocode which operates in 2-dimensions and functions in accordance with the above description, where the parameters in the "calculate_force" function include the "collision" force preventing overlap; the "attractive" or "gravity" force to attract connected nodes; the "repulsive" or "charge" force to generally force pairs of nodes apart; and the "centering" force which acts to generally center the position of the group of nodes.

```
// modify node spatial location for each iteration
for each node n, n∈Nodes
    // calculate velocity due to various forces
    velocity_x=calculate_force(n.x, parameters)
    velocity_y=calculate_force(n.y, parameters)
    //add extra repulsive force to in this case move to first
        and second groups apart
    //ie, to the left and right
    if distance(highest_degree_node(first_group),
        highest_degree_node(second_group))<threshold
        if n∈first_group
            velocity_x=move_left(velocity_x)
        else
            velocity_x=move_right(velocity_x)
        endif
    endif
    // increment position of node
    n.x=n.x+velocity_x
    n.y=n.y+velocity_y
endfor
```

In the above example pseudo-code, the additional group repulsing force is implemented so that the first and second groups are pushed in opposite directions (eg, in this example to the left and right) until the distance between the highest degree nodes (ie, the node having the most connections (see above)) of each of the first and second groups reaches a predetermined threshold. In another example, the predetermined threshold is proportional to the total number of nodes in the composite graph structure.

As can be seen from the above pseudo-code, this approach is carried out for a predetermined number of iterations, Q, where the node spatial locations are updated at step 353 to ensure a stabilized solution for the node spatial locations. In this illustrative example, the number of iterations was chosen to be 300 to ensure good convergence to an equilibrium configuration for the final node spatial locations at step 354 without potentially becoming stuck in a local minimum.

While the above example involves a 2-dimensional approach, the forces may be generalized to 3-dimensions and numerically solved to determine node spatial locations in 3-dimensions.

Referring once again to FIG. 1, now that the composite graph structure has been fully generated, including the determination of the node spatial locations, then at step 400 the composite graph structure may be spatially displayed on a suitable display capable of positioning the nodes and their respective edges in accordance with the node spatial location for each node. As would be appreciated, many computer based displays are based on pixels (2-dimensions) or voxels (3-dimensions) and the node spatial locations may be appropriately scaled in accordance with the size and pixel density of the display.

In one example, the composite graph structure includes the parameter "node_spatial_location" which is an array of two or three location values depending on whether the display is to be in 2 or 3 dimensions. As would be appreciated, the node spatial locations may be expressed in any suitable coordinate system not necessarily limited to Cartesian coordinates including, but not limited to, polar, spherical or cylindrical coordinates. In other illustrative embodiments, the node spatial locations may be configured to be projected onto a non-planar surface such as a sphere or other arbitrary curved surface.

Figure 5:
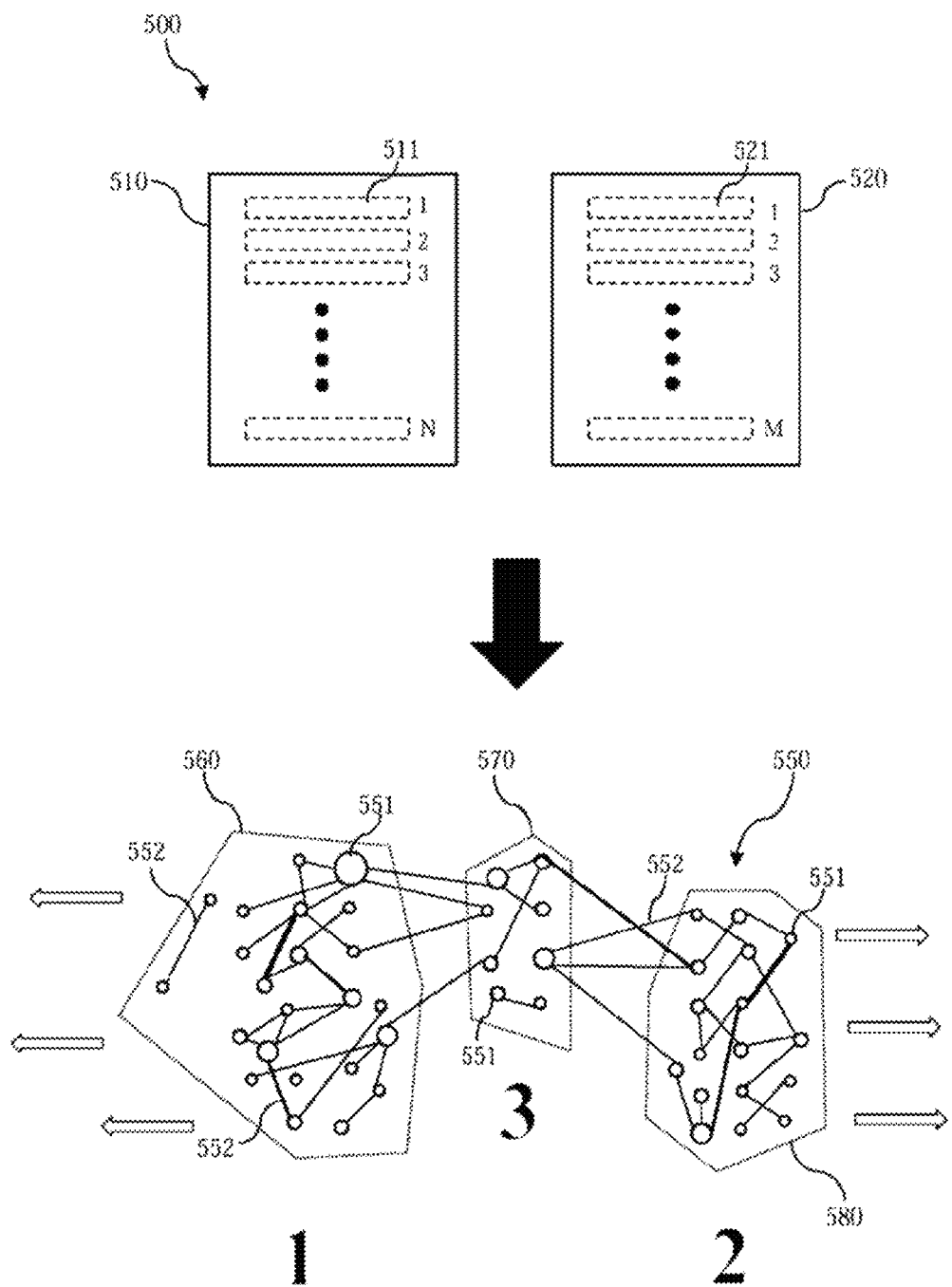
FIG. 5 is a figurative overview diagram of a method for identifying and visualizing differences between first and second sets of text items in accordance with an illustrative embodiment.

Referring now to FIG. 5, there is shown a figurative overview diagram 500 of a method for identifying and visualizing differences between first and second sets of text items in accordance with an illustrative embodiment. In this example, the first set 510 comprises, in this example, N text items 511 and the second set 520 comprises, in this example, M text items 521. In accordance with the present disclosure, a collection of named entities are extracted from the combined text items 511, 521 and composite graph structure 550 is generated which is configured to display the differences between the first 510 and second 520 sets of text items 511, 521.

In this embodiment, individual nodes 551 corresponding to the named entities are extracted from text items 511, 521. Where there is a relationship or connection determined between a pair of nodes an edge 552 is defined between the nodes as indicated in composite graph structure 550. In this example, the size of each depicted node 551 is directly related to the degree of the node which is defined as the number of edges connecting to a given node. In one embodiment, where there are multiple instances of two nodes being connected, this is indicated by changing the depiction of the edge as displayed. In one example, the number of instances where the same two nodes are connected is indicated by changing the thickness of the displayed line indicating the edge where, in this case, a thicker line indicates more connections. In another example, the color of the edge may change in accordance with the number of edges between two nodes. In one example, the composite graph structure 550 includes an "edge_weight" parameter for each pair of nodes which is set to the number of edges or connections between the pair of nodes.

Composite graph structure 550 further comprises a first group of nodes 560 which corresponds to the named entities that were extracted exclusively from the first set 510 of text items 511 and a second group of nodes 580 which corresponds to the named entities that were extracted exclusively from the second set 520 of text items 521 while the third group of nodes 570 corresponds to named entities that were extracted from both the first and second sets 510, 520 of text items 511, 521. As would be appreciated, the composite graph structure as defined so far is a data structure, which while defining some relationships between the sets of text items, is not suitable for visualization.

In accordance with the present disclosure, node spatial locations are determined for each of the nodes that display differences between the first and second sets 510, 520 in accordance with a force-directed model. In one example, the node spatial locations are subject to the constraint that an intragroup edge length between connected pairs of nodes in the same group must be less than the intergroup edge length of edges that connect pairs of nodes which are in different groups. As would be appreciated, this will function to cluster spatial node locations in their respective groups while still displaying the linkages between the respective groups.

In this example, the force-directed model includes a repulsive force operating on all nodes to generally force them apart and an attractive force operating on connected nodes to attract them together. As would be appreciated, this will function to visually highlight the connected nodes due to their proximity to each other.

The force-directed model in this illustrative embodiment further includes a group repulsing force that functions to force apart the first and second groups of nodes 560, 580 in opposite directions as indicated by the arrows. As the first and second group of nodes correspond to named entities that occur exclusively in either the first set 510 or the second set 520, respectively, then this will function to highlight the differences between sets of text items. While the first and second groups of nodes 560, 580 move in opposite directions, the common group of nodes 570 will naturally locate in the middle between the first and second groups 560, 580, as a result highlighting the corresponding named entities that occur in both first set 510 and the second set 520 of text items 511, 521.

Figure 6:
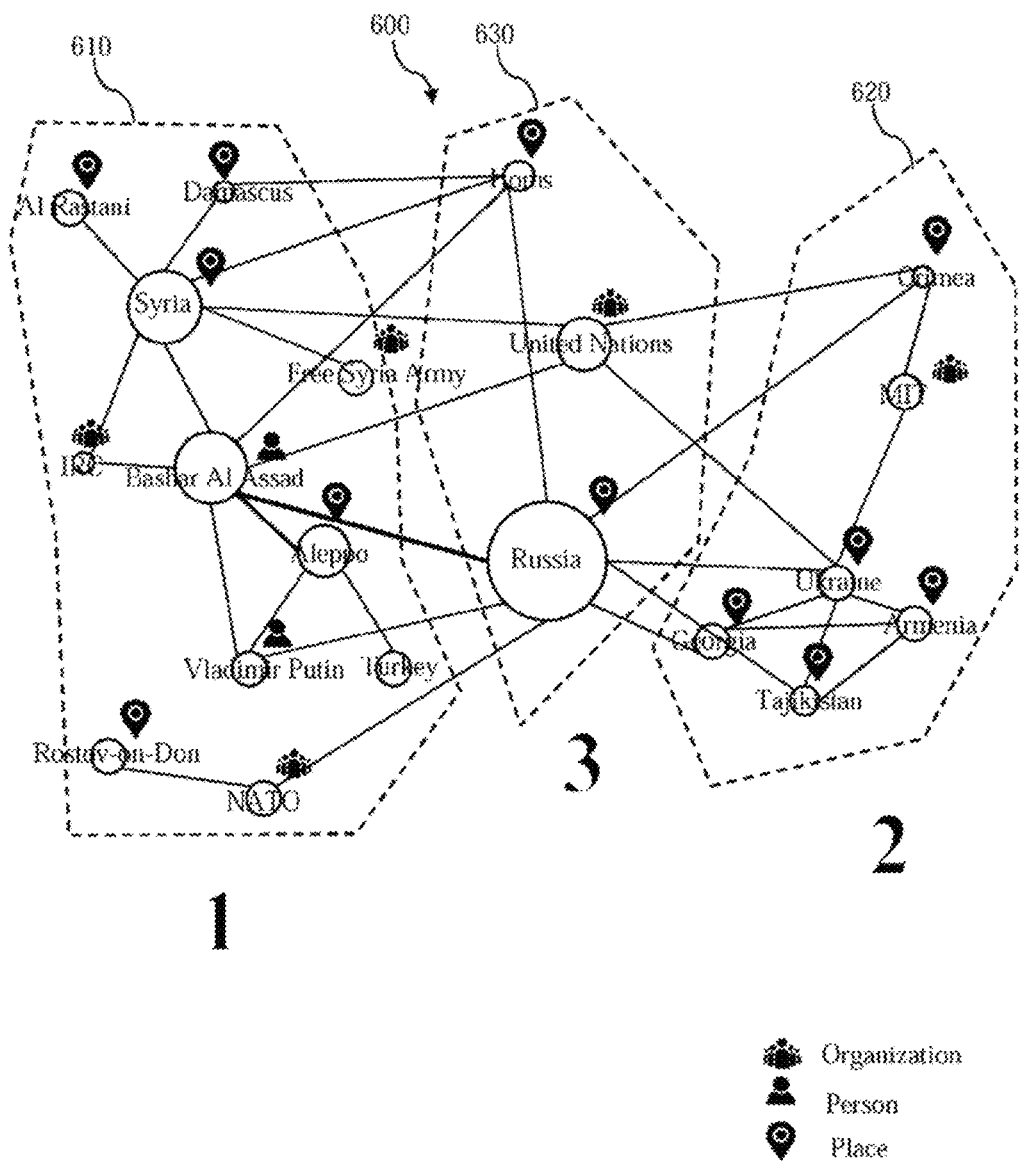
FIG. 6 is a figurative overview diagram of a composite graph structure generated from social media posts originating from two different time periods in accordance with an illustrative embodiment.

Referring now to FIG. 6, there is shown a figurative overview diagram of a composite graph structure 600 generated from social media posts originating from two different time periods according to an illustrative embodiment. In this example, composite graph structure 600 has been generated from the tweets emanating from a twitter account commenting on Russian based sociopolitical issues. In this case, the first set of text items comprises tweets for the two week period commencing 1 May 2016 and the second set of text items comprises tweets for the two week period commencing 1 Aug. 2016. As would be appreciated, a user interface may be provided for display 1060.

Composite graph structure 600 shows a first 610, second 620 and third group 630 of nodes whose node spatial locations have been generated in accordance with the present disclosure to identify and visualize the differences between the first and second set of tweets. In this example, the displayed composite graph structure 600 also depicts the type or classification of the extracted named entity forming the basis of the node. As would be appreciated, visual display techniques such as the use of color and line type may be used to signify different aspects of composite graph structure 600.

In one example, the present method includes only extraction of named entities of a particular entity type or types as discussed above. In accordance with this approach, the composite graph structure may be based on named entities that are only of entity type "Person" or "Organization" or perhaps of entity types "Person" and "Organization" but ignoring entity type "Place". This functionality may also form part of the display processing which based on a full generated composite graph structure 600, will selectively filter for particular entity types and their connections when displaying the composite graph structure 600.

As can be seen from inspection, composite graph structure 600 provides a visual indication of the differences between the two sets of tweets (or more generally text items), but importantly provides a degree of differentiation and context by showing the links between the various nodes and further by showing those nodes (and their links) that are common to both sets of tweets. This visualization can provide rapid categorization of potentially a very large number of nodes. In other examples, other visualization metaphors based on the "node_degree" or "edge_weight" parameters of the composite graph structure may be employed, eg increasing the size of a node or the thickness of an edge, to further assist the identification of important entities or connections in the visualization between the sets of text items.

Referring back to FIG. 6, it can be seen that the tweets involving both the United Nations and Russia were both voluminous and common to both the first and second set of tweets. As can also be readily determined, the first set of tweets 610 corresponding to the first group of nodes 610 concentrates on the conflict in Syria while the second set of tweets concentrates on subject material that is closer to Russia and its geopolitical sphere of interest. It can also be seen that the tweets of the first time period covered a greater range of discrete topics as compared to the tweets of the second time period.

For very large data sets, the composite graph structure may be modified to only include those nodes having more than a threshold number of edges or connections, ie, the node will only form part of the composite graph structure if the degree of the node is above some threshold. As would be appreciated, this functionality could also form part of the display processing in which case a full composite graph structure would be generated but only certain aspects of the composite graph structure would be displayed.

In another embodiment, a list of specific entities may be preset and the composite graph structure generated comprising only named entities or nodes corresponding to the list of specific entities. This could allow an operator to conduct focused inquiries concentrating on specific entities between sets of text items as required. Again, this functionality may form part of the display processing where the full composite graph structure is generated but a user is able to select which entities are to be displayed, as a result forming a filtered composite graph structure directed only to the selected named entities or nodes.

In yet another embodiment, a list of specific relationships may be preset and the composite graph structure generated comprising only named entities or nodes that are connected from the list of specific relationships. Once again, this functionality may form part of the display processing where a user may select one or more relationships which are to be displayed, as a result forming a filtered composite graph structure directed only to those nodes or named entities that are connected by the nominated relationships.

Referring again to FIG. 2, and to the system overview diagram of data display system 1000, in one example the functionality of the present method is implemented in Python with a webpage based front end functioning as the display and optional user interface 1060. In one example, the NetworkX Python library is adopted for the generation, manipulation and the display of the composite graph structure. The composite graph structure comprising at least the nodes, edges and node spatial locations as generated in accordance with the present disclosure may be stored in any one of a number of various graph or network file formats including, but not limited to, GEXF, GML, Pickle, GraphML, JSON, LEDA, YAML, SparseGraph, Pajek, or GIS.

Figure 7:
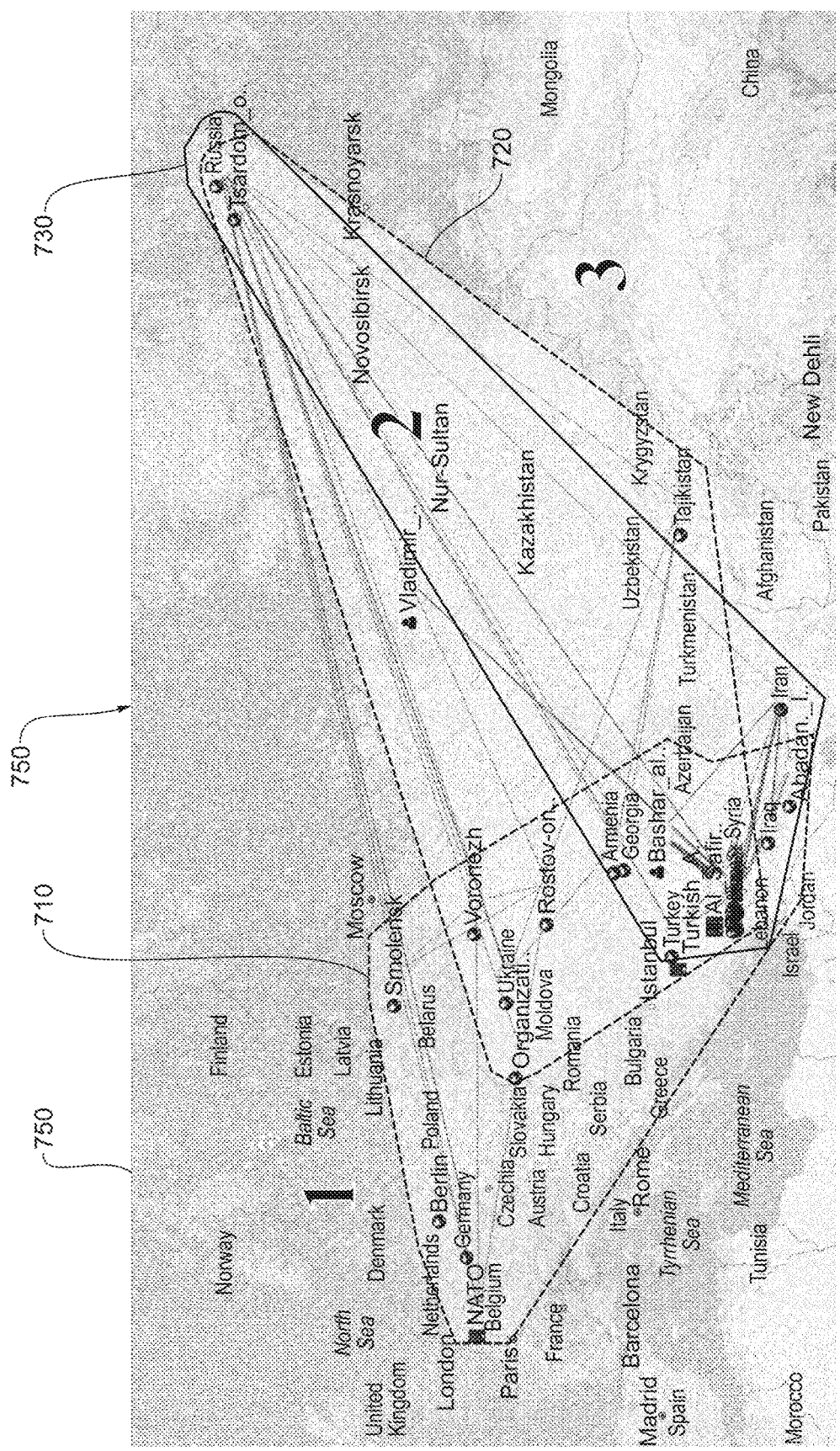
FIG. 7 is a figurative overview diagram of a composite graph structure generated from social media posts again originating from two different time periods in accordance with another illustrative embodiment.

Referring now to FIG. 7, there is shown a figurative overview diagram of a composite graph structure 700 again generated from social media posts originating from two different time periods according to another illustrative embodiment. Once again in this example, composite graph structure 700 has been generated from the tweets emanating from a twitter account commenting on Russian based sociopolitical issues.

By contrast to the composite graph structure 600 depicted in FIG. 6, in this example, composite graph structure 700 includes a geographic constraint that applies to a selection of node spatial locations determined in accordance with this embodiment. In this example, the node spatial locations are once again determined by a force-directed model but in this case, the node spatial locations for nodes (ie, geographical nodes) corresponding to named entities of entity type "Place" or otherwise relating to a geographical location (ie, a "geographical" nodes) are subject to an initial overriding constraint that the determined node spatial location corresponds to this geographical location. As a non-limiting example, the entity MIT will have an associated or related geographical location of Cambridge, Massachusetts, USA.

In one example, where the coordinate system for the node spatial location is specified in terms of longitude and latitude, the geographical location will be the longitude and latitude coordinates for the corresponding "Place" or associated geographical location of the node. As would be appreciated, any coordinate system or projection that functions to show the relative geographical positioning of nodes having an associated geographic location may be adopted.

As shown in FIG. 7, nodes corresponding to a "Place" have a determined node spatial location that corresponds to the 2-dimensional geographic position on 2-d map projection 750 of the world. Once again composite graph structure 700 shows a first 710, second 720 and third group 730 of nodes whose node spatial locations have been generated in accordance with the present disclosure but subject to the initial overriding constraint that nodes relating or corresponding to a geographical location will have a node spatial location representative of that geographical location.

As can be seen by inspection, nodes corresponding to geographic locations Russia, Tajikistan, Ukraine, Georgia etc have a node spatial location corresponding to their location on 2-d map projection 750 of the world. In this example, these node spatial locations correspond to the geographic location or are representative of the graphic location, such as in the example of countries. In one embodiment, a node spatial location corresponding to a country or region will be a predetermined location representative of that country or region (eg, Russia). In another example, the node spatial location will be subject to the constraint that it must lay within the geographic border of the country or region but is otherwise subject to the force-directed model.

As would be appreciated, given the initial overriding constraint that the node spatial locations of some of the nodes will be predetermined based on their geographical location, this will mean that other constraints, such as the intragroup edge length between pairs of nodes in the same group being always less than an intergroup edge length that connects pairs of nodes between, cannot always be satisfied. As shown in FIG. 7, and as a result, the third or common group of nodes 730 will not necessarily be located between the first and second groups 710, 720. In this example, a representative border is formed around each group with the first and second groups 710, 720 having a dashed border and the common group 730 having a solid border. In other examples, these regions may be colored or shaded differently to accentuate their differences.

As would be appreciated the composite graph structure may also include further parameters including, but not limited to:
  node_id (ie, for each node a unique parameter indicating corresponding node);
  node_spatial_location (ie, for each node an array of coordinates corresponding to the determined location of the node);
  node_named_entity (ie for each node the named entity corresponding to the node);
  node_type (ie, for each node a parameter indicating the type of named entity corresponding to the node—people, place, organization, etc);
  node_group_id (ie, for each node a parameter indicating which group the node is in);
  node_degree (ie, for each node a parameter indicating the number of edges connecting to the node);
  node_associated_geographical_location (ie, for each node a parameter indicating any geographical location that is associated with the named entity corresponding to the node);
  edge_id (ie, for each edge a unique parameter indicating the corresponding edge);
  edge_type (ie, for each edge a parameter indicating the type of edge—undirected or directed);
  edge_source_node_id (ie, source node id for this edge);
  edge_target_node_id (ie, target node id for this edge);
  edge_time_stamp (ie, for each edge a parameter indicating a determined time for the relationship/connection defining the edge);
  edge_relationship (ie, for each edge a parameter indicating the relationship type characterizing the link between the two nodes that the edge extends between); or
  edge_weight (ie, for each edge a parameter indicating the number of the occurrence of the edge).

Figure 8:
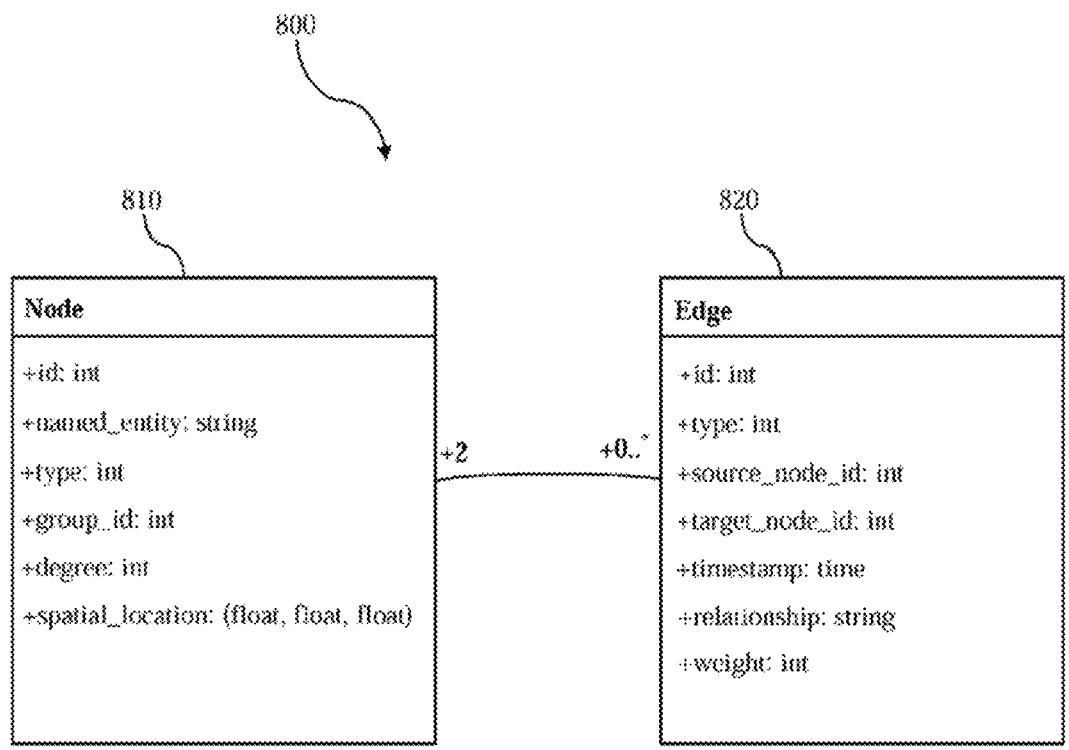
FIG. 8 is a Unified Modeling Language (UML) class diagram of a composite data structure in accordance with an illustrative embodiment.

Referring now to FIG. 8, there is shown UML class diagram 800 of the underlying data model for an exemplary composite graph structure according to an illustrative embodiment setting out example parameters for the respective nodes 810 and edges 820 forming the composite graph structure.

As would be appreciated, the present disclosure provides automated methods and systems that allows for the rapid visualization and analysis of differences between sets of text items as compared to other computer generated visualization tools such as word clouds and the like. This capability has many practical applications in data analysis especially where a visual summary is required to identify the differences between different groups of textual information. As shown by composite graph structure 700 depicted in FIG. 7, the visualization may also be configured to represent and compare geographical references that may occur in the text items. This can be especially useful where there is a geopolitical context to the text items being analyzed.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In various embodiments of the present disclosure, a single component or module may be replaced by multiple components, and multiple components may be replaced by a single component, to perform a given function or functions. Except where such substitution would not be operative to practice embodiments of the present disclosure, such substitution is within the scope of the present disclosure. In accordance with this, any of the servers described in the present disclosure may be implemented as logical processes on a single computer processor or alternatively distributed amongst a group of networked servers that are located and configured for cooperative functions.

As would be appreciated, usage of terms such as entity extraction module, composite graph structure generating module, node assignment module, edge determination module, node spatial location determination module and display driver in the context of data display system 1000 should not be taken to imply that separate processes or processors are required to implement the functionality of the present method and system.

Various embodiments of the systems and methods of the present disclosure may employ one or more electronic computer networks to promote communication among different components, transfer data, or to share resources and information. Such computer networks can be classified according to the hardware and software technology that is used to interconnect the devices in the network, such as optical fibre, Ethernet, wireless LAN, HomePNA, power line communication or G.hn. The computer networks may also be embodied as one or more of the following types of networks: local area network (LAN);
  metropolitan area network (MAN); wide area network (WAN); virtual private network (VPN); storage area network (SAN); or global area network (GAN), among other network varieties.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A computer-implemented method for identifying and visualizing differences between a first set comprising one or more text items and a second set comprising one or more text items, the method comprising:
    extracting a collection of named entities from the first and second sets of one or more text items;
    generating a composite graph structure from the collection of named entities, the composite graph structure including differences between the first and second sets of one or more text items, wherein generating the composite graph structure comprises:
        assigning a node to each named entity from the collection of named entities;
        establishing relationships between pairs of nodes including defining edges between those pairs of nodes where a relationship has been established;
        establishing one or more groups of nodes based on the nodes assigned to each named entity, wherein the one or more groups of nodes includes a first group of nodes corresponding to named entities exclusively from the first set of one or more text items, a second group of nodes corresponding to named entities exclusively from the second set of one or more text items, and a third group of nodes corresponding to named entities from both the first and second sets of one or more text items;
    assigning a node spatial location to each of the nodes for displaying the differences between the first and second sets of one or more text items, wherein assigning the node spatial location includes determining the node spatial location in accordance with a force-directed model and wherein the node having an associated geographical location is subject to an initial overriding constraint that the associated determined node spatial location is representative of the geographical location; and
    in response to assigning the node spatial location, displaying spatially the composite graph structure, wherein each of the assigned node spatial locations is displayed according to a constraint, and wherein the constraint is such that connected pairs of nodes in the same group are connected by edges having an intragroup edge length which is less than an intergroup edge length that connects different groups of nodes.

2. The method of claim 1, wherein determining the node spatial locations in accordance with the force-directed model includes subjecting all nodes to a repulsive force operating on all nodes to generally force them apart.

3. The method of claim 1, wherein determining the node spatial locations in accordance with the force-directed model includes subjecting all connected nodes to an attractive force to generally attract the respective pairs of connected nodes together.

4. The method of claim 1, wherein determining the node spatial locations in accordance with the force-directed model includes subjecting the first group of nodes and the second group of nodes to a group repulsive force operating to force the first and second groups of nodes in opposite directions from each other.

5. The method of claim 1, wherein determining the node spatial locations in accordance with the force-directed model includes iterating the model over a number of iterations to determine final node spatial locations.

6. The method of claim 1, wherein determining whether there is the relationship between the respective pairs of nodes includes determining whether the respective pairs of nodes occur in text segments.

7. The method of claim 6, wherein determining whether there is the relationship between the respective pairs of nodes includes determining whether the respective pairs of nodes have entity relationships defined by the text segments.

8. The method of claim 1, wherein one or more text items of the first or second set of one or more text items comprises a structured text item, the structured text item including two or more named entities connected by a relationship.

9. The method of claim 1, wherein the first set of one or more text items comprises one or more social media posts originating from a social media account on a social media platform for a first time period and the second set of one or more text items comprises further social media posts originating from the social media account for a second time period.

10. The method of claim 1, wherein the first set and second sets of one or more text items concern the same topic.

11. A data display system for identifying and visualizing differences between a first set comprising one or more text items and a second set comprising one or more text items, the data display system comprising:
    an entity extraction module comprising one or more processors for extracting a collection of named entities from the first and second sets of one or more text items;
    a composite graph structure generating module comprising one or more processors for generating a composite graph structure from the collection of named entities, the composite graph structure configured to display differences between the first and second set of one or more text items, wherein the composite graph structure generating module comprises:
        a node assignment module to assign a node to each named entity from the collection of named entities;
        an edge determination module to establish relationships between pairs of nodes and defining an edge between those pairs of nodes where the relationship has been established;
        wherein the node assignment module further establishes one or more groups of nodes based on the nodes assigned to each named entity, wherein the one or more groups of nodes includes:
            a first group of nodes corresponding to named entities exclusively from the first set of one or more text items;
            a second group of nodes corresponding to named entities exclusively from the second set of one or more text items; and
            a third group of nodes corresponding to named entities from both the first and second sets of one or more text items;

a node spatial location determination module for assigning a node spatial location to each of the nodes for displaying the differences between the first and second sets of one or more text items, wherein assigning the node spatial location includes determining the node spatial location in accordance with a force-directed model and wherein the node having an associated geographical location is subject to an initial overriding constraint that the associated determined node spatial location is representative of the geographical location; and an electronic display for displaying spatially the composite graph structure, wherein each of the assigned node spatial locations is displayed according to a constraint, and wherein the constraint is such that connected pairs of nodes in the same group are connected by edges having an intragroup edge length which is less than an intergroup edge length that connects different groups of nodes.

12. The data display system of claim 11, wherein determining the node spatial locations in accordance with the force-directed model includes subjecting all nodes to a repulsive force operating on all nodes to generally force them apart.

13. The data display system of claim 11, wherein determining the node spatial locations in accordance with the force-directed model includes subjecting all connected nodes to an attractive force to generally attract the respective pairs of connected nodes together.

14. The data display system of claim 11, wherein determining the node spatial locations in accordance with the force-directed model includes subjecting the first group of nodes and the second group of nodes to a group repulsive force operating to force the first and second groups of nodes in opposite directions from each other.

15. The data display system of claim 11, wherein determining the node spatial locations in accordance with the force-directed model includes iterating the force-directed model over a number of iterations to determine final node spatial locations.

16. The data display system of claim 11, wherein determining whether there is the relationship or connection between the respective pairs of nodes includes determining whether the respective pairs of nodes occur in text segments.

17. The data display system of claim 16, wherein determining whether there is the relationship between the respective pairs of nodes includes determining whether the respective pairs of nodes have entity relationships defined by the text segments.

18. The data display system of claim 11, wherein one or more text items of the first or second set of one or more text items comprises a structured text item, the structured text item including two or more named entities connected by a relationship.

19. The data display system of claim 11, wherein the first set of one or more text items comprises one or more social media posts originating from a social media account on a social media platform for a first time period and the second set of one or more text items comprises further social media posts originating from the social media account for a second time period.

20. The data display system of claim 11, wherein the first set and second sets of one or more text items concern the same topic.

21. A data display system for identifying and visualizing differences between a first set of text items and a second set of text items, the system comprising:

one or more processors; and a memory for storing one or more programs, wherein when the one or more programs are executed by the one or more processors, the one or more processors are enabled to implement operations comprising:

extracting a collection of named entities from the first and second sets of text items;

generating a composite graph structure from the collection of named entities, the composite graph structure including differences between the first and second sets of text items, wherein generating the composite graph structure comprises:

assigning a node to each named entity from the collection of named entities;

establishing relationships between pairs of nodes including defining edges between those pairs of nodes where a relationship has been established;

establishing one or more groups of nodes based on the nodes assigned to each named entity, wherein the one or more groups of nodes includes:

a first group of nodes corresponding to named entities exclusively from the first set of one or more text items;

a second group of nodes corresponding to named entities exclusively from the second set of one or more text items;

a third group of nodes corresponding to named entities from both the first and second sets of one or more text items; and assigning a node spatial location to each of the nodes for displaying the differences between the first and second sets of one or more text items, wherein assigning the node spatial location includes determining the node spatial location in accordance with a force-directed model and wherein the node having an associated geographical location is subject to an initial overriding constraint that the associated determined node spatial location is representative of the geographical location; and in response to assigning the node spatial location, displaying spatially the composite graph structure, wherein each of the assigned node spatial locations is displayed according to a constraint, and wherein the constraint is such that connected pairs of nodes in the same group are connected by edges having an intragroup edge length which is less than an intergroup edge length that connects different groups of nodes.

22. A non-transitory computer-readable medium for identifying and visualizing differences between a first set of text items and a second set of text items, comprising instructions stored thereon, that when executed on a processor, perform operations comprising:

extracting a collection of named entities from the first and second sets of text items;

generating a composite graph structure from the collection of named entities, the composite graph structure including differences between the first and second sets of text items, wherein generating the composite graph structure comprises:

assigning a node to each named entity from the collection of named entities;

establishing relationships between pairs of nodes including defining edges between those pairs of nodes where a relationship has been established;

establishing one or more groups of nodes based on the nodes assigned to each named entity, wherein the one or more groups of nodes includes:

a first group of nodes corresponding to named entities exclusively from the first set of one or more text items;
a second group of nodes corresponding to named entities exclusively from the second set of one or more text items;
a third group of nodes corresponding to named entities from both the first and second sets of one or more text items; and assigning a node spatial location to each of the nodes for displaying the differences between the first and second sets of one or more text items, wherein assigning the node spatial location includes determining the node spatial location in accordance with a force-directed model and wherein the node having an associated geographical location is subject to an initial overriding constraint that the associated determined node spatial location is representative of the geographical location; and in response to assigning the node spatial location, displaying spatially the composite graph structure, wherein each of the assigned node spatial locations is displayed according to a constraint, and wherein the constraint is such that connected pairs of nodes in the same group are connected by edges having an intra-group edge length which is less than an intergroup edge length that connects different groups of nodes.

* * * * *